United States Patent [19]

Middleton

[11] 4,427,310

[45] Jan. 24, 1984

[54] LUBRICATED BEARING

[75] Inventor: Andrew H. Middleton, Southampton, England

[73] Assignee: British Gas Corporation, London, England

[21] Appl. No.: 378,234

[22] Filed: May 14, 1982

[30] Foreign Application Priority Data

Jul. 10, 1981 [GB] United Kingdom ............... 8121273

[51] Int. Cl.$^3$ ..................... F16C 33/10; F16C 27/08; F16C 11/06
[52] U.S. Cl. .................... 384/415; 384/193; 384/215; 384/378; 403/143
[58] Field of Search ............... 384/203, 206, 213, 368, 384/369, 371, 378, 372, 373, 239–246, 415, 416, 417, 418, 419, 193, 194, 107–113, 121, 124, 125, 215, 216, 230, 231–235; 403/143, 141, 142, 122, 132, 120

[56] References Cited

U.S. PATENT DOCUMENTS

| | | | |
|---|---|---|---|
| 3,647,249 | 3/1972 | Baba et al. | 384/276 |
| 3,927,921 | 12/1975 | Wolley | 384/415 |
| 4,372,621 | 2/1983 | Farrant | 384/125 |

FOREIGN PATENT DOCUMENTS

| | | | |
|---|---|---|---|
| 982885 | 2/1965 | United Kingdom | 403/132 |
| 1246287 | 9/1971 | United Kingdom | 384/213 |
| 2902492 | 7/1979 | United Kingdom | 384/110 |

*Primary Examiner*—Stuart S. Levy
*Assistant Examiner*—Thomas R. Hannon
*Attorney, Agent, or Firm*—Lalos, Leeds, Keegan, Lett & Marsh

[57] ABSTRACT

A lubricated bearing has a rotatable structure which includes a housing with an opening at one end, a bearing cup and a retaining member. The retaining member grips the exterior of the bearing cup and the interior of the housing to secure the bearing cup within the housing with its mouth towards the opening and with lubricant spaces between the housing and bearing cup both above and below its rim. A stationary member has a spherical part which fits within the bearing cup to provide relatively rotatable bearing surfaces and a shaft which extends out of the housing through the opening.

18 Claims, 10 Drawing Figures

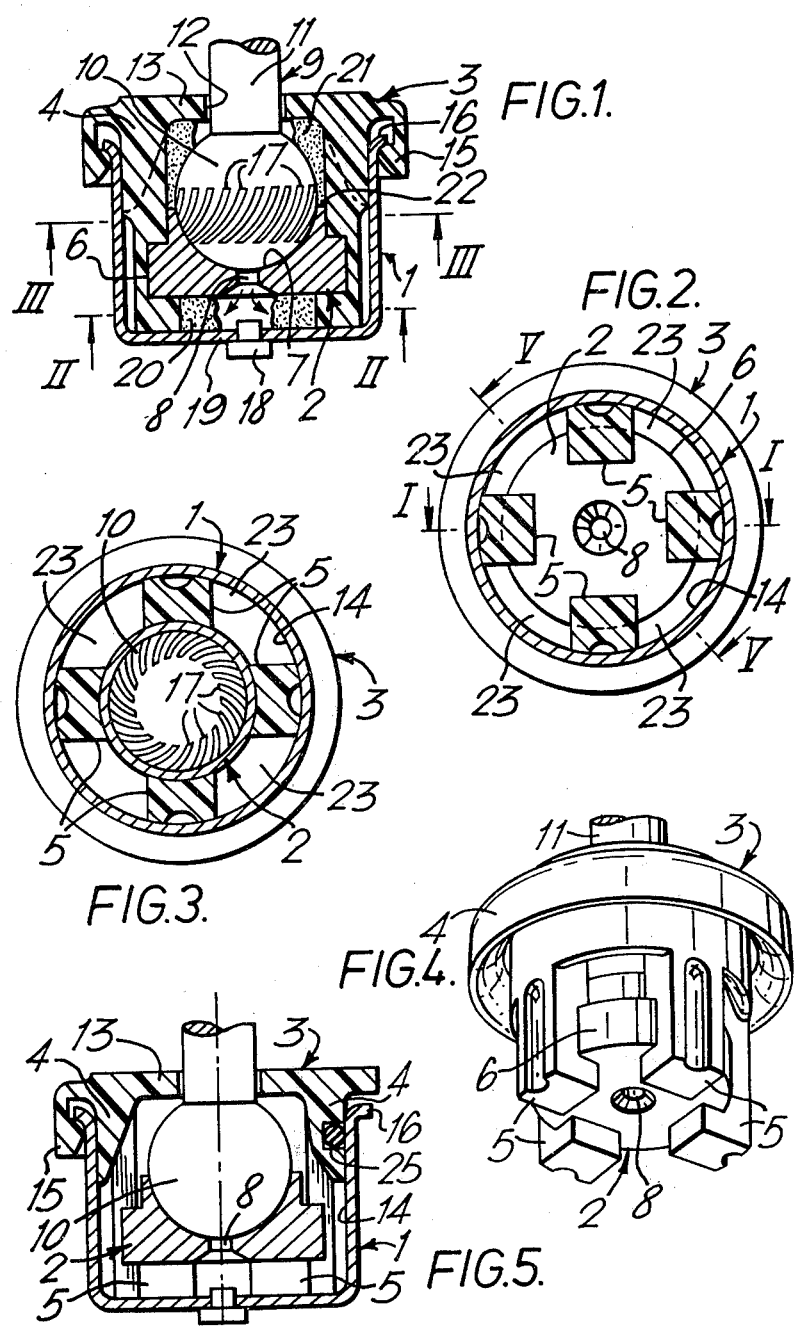

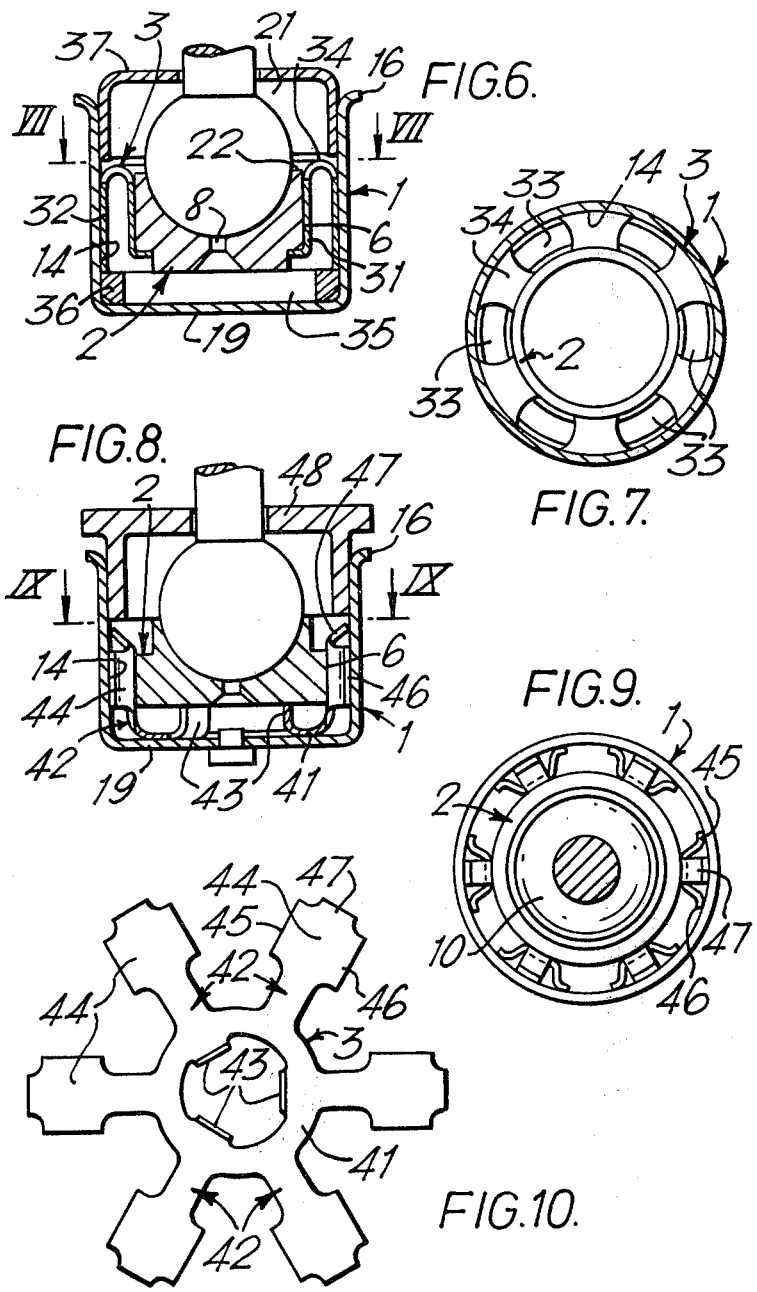

LUBRICATED BEARING

BACKGROUND OF THE INVENTION

This invention relates to lubricated bearings capable of supporting both radial and axial loads.

PRIOR ART

One form of such a lubricated bearing is disclosed in United Kingdom Patent Specification No. 1 443 448 and has a rotary member which includes a housing with an opening at one end and a bearing cup fixed in the housing with its mouth directed towards the opening by a slotted rim flange of the bearing cup which engages the cylindrical wall of the housing. It is a disadvantage of this form of construction that the presence of the slotted rim flange may cause distortion of the hemispherical shape of the bearing cup.

An object of this invention is to provide a form of construction of a lubricated bearing which avoids the need to provide a slotted rim flange on the bearing cup.

SUMMARY OF THE INVENTION

According to the present invention there is provided a lubricated bearing comprising a rotatable structure which includes a housing with an opening at one end, a bearing cup, and a retaining member which grips the housing and also grips the bearing cup and secures the bearing cup within the housing with its mouth directed towards the opening and with a lubricant space between the housing and the bearing cup and extending on both sides of a plane defined by the mouth of the bearing cup, a stationary member having a bearing part shaped to fit in the bearing cup thereby to provide mutually cooperating relatively rotatable bearing surfaces and a part arranged to project from the housing through its opening, and means for preventing the discharge of lubricant from the opening of the housing as the housing rotates.

It will be appreciated that in the paragraph above and throughout the specification and claims the words "grip" and "grips" are used in a sense such to connote not only "to embrace and hold securely" but also "to engage and hold securely".

The retaining member may grip part of the interior surface of the housing and grip part of the outer surface of the bearing cup. The retaining member may also grip part of the rim of the housing. The outer surface of the bearing cup which is gripped by the retaining member may be substantially cylindrical.

Either the bearing cup or the stationary member may be provided with grooves in its bearing surface arranged to produce a viscous pumping action on the lubricant in the bearing when the rotatable structure rotates to cause the lubricant, which may be grease or oil, to flow from the lubricant space to between the rotary and stationary bearing faces. Thus, the mutully cooperating bearing surfaces are always separated by a moving film of lubricant whilst the bearing is in operation, although they will be axially biased towards each other, for example, by spring or gravitational loading of one bearing member with respect to the other, in order to ensure satisfactory pumping action on the lubricant.

The pumping grooves may be provided on the external surface of the bearing part of the stationary member, or on the internal surface of the bearing part of the cup which has an aperture located in the base portion thereof.

In use of the bearing, the lubricant space within the housing is filled with lubricant to a level beyond the mouth of the cup so that during rotation of the housing the lubricant assumes a vortex within the housing causing it to adopt a tube-like shape as it is forced centrifugally outwards against a peripheral wall of the housing and/or the retaining member.

The amount of lubricant placed in the housing should be such as to ensure that it extends over the rim of the cup when the housing is rotating at its minimum speed and in consequence held by centrifugal force in said tube-like shape so that the lubricant can be drawn by the viscous pumping action of the pumping grooves between the cup and bearing surface of the stationary bearing member and then discharged through the central aperture in the cup whence it is caused to recirculate into the mass of lubricant in the housing.

In use the lubricant will be forced towards the opening of the housing as the speed of rotation of the housing increases, but it is prevented from escaping from the opening of the housing by the discharge preventing means, which could conveniently take the form of a cover integral with the retaining member, although it may take the form of a separate cover fixed to, so as to rotate with, the housing, said opening of the housing then being formed at the centre of the cover. Where the lubricant is a grease, it will tend to retain said tube-like shape after initial operation of the bearing.

The projecting part, which may take the form of a stub axle of the stationary member extends with a small clearance through the opening in the cover. Since the lubricant adopts a tube-like shape and is forced against the peripheral wall of the housing and/or the retaining member, it is held by the centrifugal force away from the central opening in the cover and this prevents escape of the lubricant.

The mutually cooperating bearing surfaces of the bearing cup and the stationary bearing member are preferably of hemispherical shape, but they may, for example, as an alternative, be conical or frustoconical.

Where, for example, the lubricant is grease, it will maintain its tube-like shape which has been impressed upon it when rotation ceases. This is due to the property of grease which requires that a stress of above a certain magnitude must be applied to it before it will move out of the position which it has adopted. The stress required to produce movement is greater than that imposed upon it by its own weight.

Such a grease filled bearing may be operated with the axis of rotation of its housing lying in any direction. If oil were the lubricant used, it would, of course, run out of the opening in the cover as soon as rotation ceased and the bearing became tilted from a position with its axis vertical to such an extent that the oil surface intersected the opening in the cover. However, oil filled bearing can be used in an inverted position if a rotary seal is provided between the housing and the stationary bearing member.

Normally, the bearing surfaces could be in contact with each other at the commencement of rotation and before flow of lubricant therebetween, and to reduce wear of the surfaces under this condition, one or both bearing surfaces may be coated with a low friction boundary lubricant, for example, P.T.F.E.

Several embodiments of the invention will now be described, by way of example, with reference to the accompanying drawings.

BRIEF DESCRIPTION OF THE DRAWINGS

FIG. 1 is a diagrammatic sectional elevation of one embodiment of the invention taken on a line I—I in FIG. 2;

FIG. 2 is a diagrammatic sectional underplan taken on the line II—II in FIG. 1;

FIG. 3 is a diagrammatic sectional underplan taken on the line III—III in FIG. 1;

FIG. 4 is a perspective view of the bearing cup and retaining member;

FIG. 5 is a diagrammatic sectional elevation taken on the line V—V in FIG. 2, but with the right-hand half section thereof showing a modification;

FIG. 6 is a diagrammatic sectional elevation of another embodiment of the invention;

FIG. 7 is a diagrammatic sectional plan taken on the line VII—VII in FIG. 6;

FIG. 8 is a diagrammatic sectional elevation of a further embodiment of the invention;

FIG. 9 is a diagrammatic sectional plan taken on the line IX—IX in FIG. 8; and

FIG. 10 is a plan of a retaining member shown in FIG. 8, but in a flattened out position before being formed to fit into the housing.

DESCRIPTION OF THE PREFERRED EMBODIMENTS

Referring in the first instance to FIGS. 1 to 4, the lubricated bearing comprises a rotatable housing 1 having a bearing cup 2 secured thereto by a retaining member 3 formed from plastics material and having an annular upper part 4 and a plurality, e.g. four depending legs 5. The bearing cup 2, which is produced from a solid block of suitable metal, has a substantially cylindrical outer surface 6 which is gripped at four circumferentially spaced positions by the legs 5 of the retaining member 3. The inner surface 7 of the bearing cup 2 is substantially hemispherical and communicates with a central aperture 8 extending through the base of the bearing cup 2.

A stationary bearing member 9 having a substantially spherical part 10 is arranged to fit under suitable axial loading into the inner surface 7 of the bearing cup 2 with a suitable concentric working clearance in use. A shaft 11 of the stationary bearing member 9 extends from the spherical part 10 and projects through an opening 12 in a cover 13 which is integral with the retaining member 3 leaving a small clearance therebetween. The outer surfaces of the four legs 5 grip the interior surface 14 of the housing 1. The bearing cup 2 is also secured within the housing 1 by a depending lip 15 on the retaining member 3 which grips the rim 16 of the housing 1 and also provides a lubricant seal.

The lower portion of the spherical bearing part 10 is formed with a plurality of inclined grooves 17 which produce a viscous pumping action on the lubricant in use of the bearing. A filling plug 18 in the base 19 of the housing 1 enables a lubricant, for example grease, to be introduced into the spaces 20 and 21 between the housing 1 and the bearing cup 2 both above and below its upper rim 22. The bearing surfaces are biased towards each other, e.g. by spring or gravitational loading of one bearing member with respect to the other. Preferably the bearing is charged with a lubricant such that the bearing may be operated with its axis of rotation lying in any direction.

In use of the bearing at working rotational speeds the lubricant assumes a vortex within the housing 1 causing it to adopt a tube-like shape as it is forced against the interior surface of the retaining member 3 as shown in FIG. 1. The viscous pumping action brought about by the inclined grooves 17 causes a circulatory flow of lubricant by way of the aperture 8 and the spaces 23 between the legs 5 of the retaining member 3 as indicated by the arrows.

In a modification of the above-described embodiment of the invention shown in the right hand half section of FIG. 5, the depending lip 15 is omitted from the integral cover 13 so that the interior surface 14 of the housing 1 is gripped by the four legs 5 of the retaining member 3 and by its upper annular part 4. An O-ring seal 25 is provided between the upper annular part 4 of the retaining member 3 and the wall of the housing 1 adjacent the rim 16 to prevent the escape of lubricant.

Referring now to FIGS. 6 and 7, in this embodiment of the invention the retaining member 3 is formed from metal, e.g. spring steel, and comprises an annulus of substantially inverted U-shaped vertical cross-section as seen in FIG. 6. The inner circumference 31 of the inverted U-section grips the cylindrical outer surface 6 of the bearing cup 2 while the outer circumference 32 grips the interior surface 14 of the housing 1. A plurality of apertures 33 is provided in the upper surface 34 of the annulus to permit the lubricant to pass from the space 21 above the rim 22 of the bearing cup 2 to the space 35 below the bearing cup 2 which is spaced from the base 19 of the housing 1 by a packing piece 36. The top cover is not integral with the retaining member 3 but is formed by a separate cap 37 of plastics material or metal which fits within the upper rim 16 of the housing 1.

Turning finally to FIGS. 8 to 10, in this embodiment of the invention the retaining member 3 comprises a resilient metal spider which is fitted within the housing 1 to secure the bearing cup 2 therein and having a central, substantially annular part 41, as seen in FIG. 10, with a plurality, e.g. six legs 42 extending radially outwards therefrom and three arms 43 extending upwards parallel to the axis of the annulus. The arms 43 serve to space the bearing cup 2 from the base 19 of the housing 1. In the manufacture of the retaining member the six legs 42 are bent so that their outer ends 44 extend substantially vertically and the peripheral portions 45, 46 and 47 of the outer ends are bent outwardly relative to the remainder. Therefore the inner surfaces of the outer ends 44 of the legs 42 grip the cylindrical outer surface 6 of the bearing cup 2 while the bent peripheral portions 45, 46 and 47 grip the interior surface 14 of the housing 1. The top cover is not integral with the retaining member 3 but is formed by a separate cap 48 of metal or plastics material which fits within the upper rim 16 of the housing 1. The cap may be fitted with sealing means, e.g. a sealing compound between its outer surface and the inner surface of the housing.

An advantage of the lubricated bearing of the invention is that the retaining member can secure the bearing cup firmly within the housing without distorting the bearing cup. Securing the bearing cup within the housing in this way also enables the bearing cup to be produced from a solid block of metal and thus enables the bearing cup to be provided with accurately shaped bearing surfaces. Further advantages of the lubricated bearing of the invention are (a) accurate and stiff radial location of the bearing cup 2 relative to the housing 1 and the rotating shaft in which it is fitted, (b) speed of assembly in mass production, (c) rotational symmetry of the bearing cup which tends to reduce the chance of distortion during manufacture, and (d) the use of a simple cylindrical pressing as the housing 1.

I claim:

1. A lubricated bearing comprising:
   a rotatable structure which includes a housing having an interior surface and an opening at one end defined by a rim;
   a bearing cup with a mouth at one end;
   a retaining member which is separate from the bearing cup and which grips the housing and also grips the bearing cup, said retaining member securing the bearing cup within the housing in spaced relationship to the interior surface thereof, with the mouth of the bearing cup directed towards the opening of the housing and with a lubricant space defined between the interior surface of the housing and the bearing cup and extending on both sides of a plane defined by the mouth of the bearing cup;
   a stationary member having a bearing part shaped to fit within the bearing cup and present mutually cooperating relatively rotatable bearing surfaces and a part arranged to project from the housing through its opening; and
   means for preventing the discharge of lubricant from the opening of the housing as the housing rotates.

2. A bearing as set forth in claim 1 wherein the bearing cup has an outer surface and the retaining member grips part of the interior surface of the housing and part of the outer surface of the bearing cup.

3. A bearing as set forth in claim 1 wherein the bearing cup has an outer surface and the retaining member grips part of the rim of the housing and part of the outer surface of the bearing cup.

4. A bearing as set forth in claim 1 wherein the bearing cup has an outer surface which is substantially cylindrical and wherein the retaining member grips part of said cylindrical surface.

5. A bearing as claimed in claim 1, wherein the retaining member comprises an annular upper part which grips the housing and a plurality of depending legs which grip the bearing cup.

6. A bearing as claimed in claim 5, wherein the retaining member has four legs which grip the bearing cup at circumferential spaced positions.

7. A bearing as claimed in claim 1 wherein the retaining member comprises a resilient annulus of substantially inverted U-shaped vertical cross-section arranged so that an inner circumference of the inverted U-section grips the bearing cup and an outer circumference grips the housing.

8. A bearing as claimed in claim 7, wherein a plurality of apertures in an upper surface of the annulus permit lubricant to pass from the space above the rim of the bearing cup to the space below the bearing cup.

9. A bearing as claimed in claim 1, wherein the lubricant space within the housing is filled with lubricant beyond the mouth of the cup so that during rotation of the housing the lubricant assumes a vortex within the housing causing it to adopt a tube-like shape as it is forced centrifugally outwards toward the interior surface of the housing but such that it can be drawn via the viscous pumping action of grooves provided in at least one of the mutually cooperating bearing surfaces and then discharged through a central aperture in the bearing cup whence it is caused to recirculate into the mass of lubricant in the housing.

10. A bearing as claimed in claim 1, wherein the retaining member is also arranged to space a base portion of the bearing cup from a corresponding portion of the housing.

11. A bearing as claimed in claim 1, wherein the rotatable and stationary parts are axially biased towards positions of mutual engagement of their bearing surfaces.

12. A bearing as claimed in claim 1, wherein the means for preventing the discharge of lubricant is in the form of a cover fixed to the housing.

13. A bearing as claimed in claim 1, wherein the means for preventing the discharge of lubricant is in the form of a cover which is integral with the retaining member.

14. A bearing as claimed in claim 1, wherein the projecting part of the stationary member is a stub axle which extends through the opening in the housing with a relatively small clearance therebetween.

15. A bearing as claimed in claim 1, charged with a lubricant such that the bearing may be operated with the axis of rotation lying in any direction.

16. A bearing as claimed in claim 1, wherein at least one bearing surface is coated with a low-friction boundary lubricant.

17. A bearing as claimed in claim 1, wherein the bearing cup is made out of a block of suitable material.

18. A bearing as claimed in claim 1, wherein the bearing cup is provided with an aperture in a base portion thereof.

* * * * *